Oct. 31, 1961 E. WEBER 3,006,204
ARRESTING DEVICE FOR PARTS MOVING UP AND DOWN
Filed July 11, 1958 2 Sheets-Sheet 1
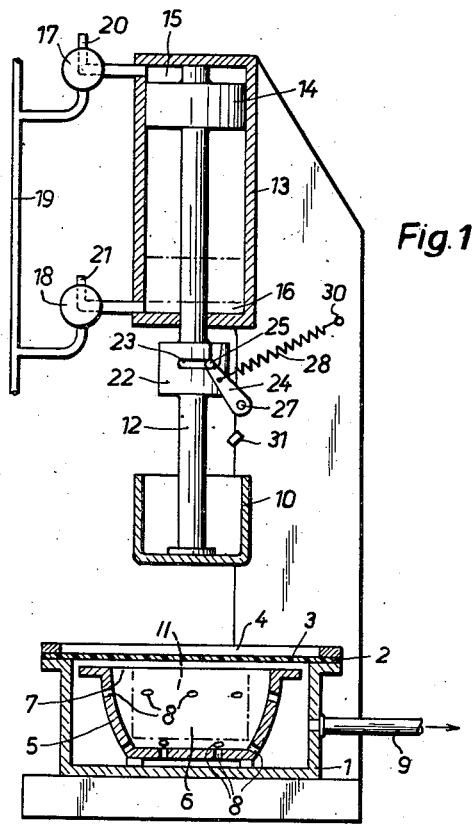
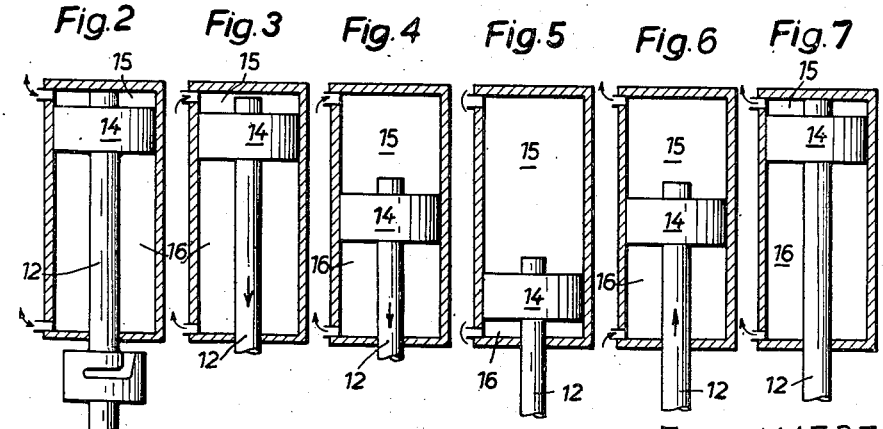
Eugen WEBER
INVENTOR
By:
Wenderoth, Lind & Ponack
Attys

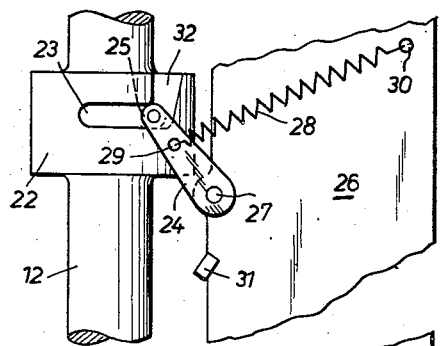
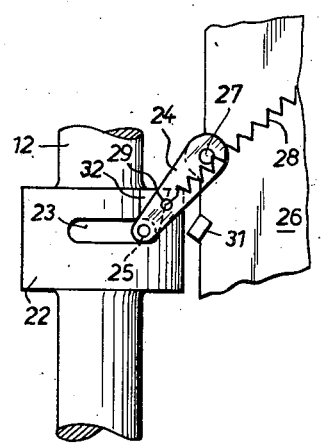
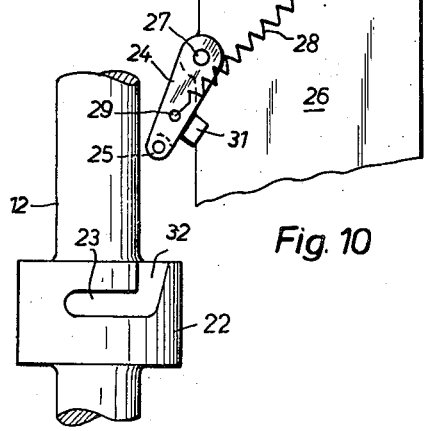
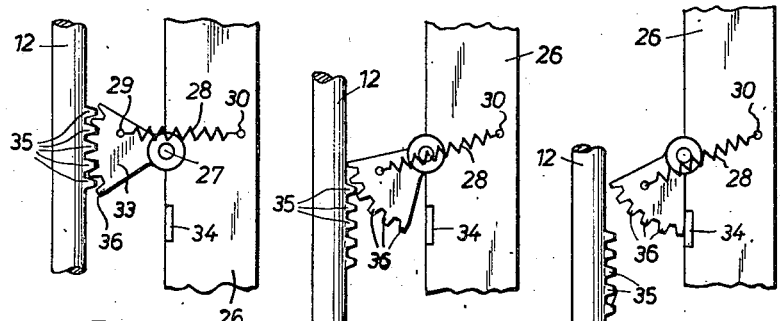

United States Patent Office 3,006,204
Patented Oct. 31, 1961

3,006,204
ARRESTING DEVICE FOR PARTS MOVING UP AND DOWN
Eugen Weber, Zurich, Switzerland, assignor to Hydro-Chemie Aktiengesellschaft, Zurich, Switzerland
Filed July 11, 1958, Ser. No. 748,573
1 Claim. (Cl. 74—100)

The present invention relates to an apparatus in which at least one part is moved up and down by means of a pressure fluid, e.g. a molding apparatus for the molding of plasticized foils of synthetic resin in which a pre-shaping plug is moved up and down, and more particularly to an apparatus of this kind in which a double-acting piston connected or linked to said part is displaceable in a cylinder by means of a compressible fluid such as air or steam.

In certain mechanisms of that kind, the part to be moved up and down should be retained against the effect of its own weight in one upper position, then moved very quickly downwards from that position, and stopped before it abuts any fixed part which would limit its downward motion.

If provision were made for retaining the said part in its said upper position by causing the pressure fluid to become effective on one side of the said double-acting piston and for thereupon moving the said part downwards by simultaneously releasing pressure fluid from the cylinder on that side of the double-acting piston while simultaneously introducing pressure fluid on the opposite side of the piston, one of two drawbacks would occur: either the pressure fluid could only escape so slowly from the cylinder on the first-mentioned side of the piston that the desired very quick downward motion of the said part could not be obtained, or, if provision were made for a sufficiently quick escape of the pressure fluid on the first-mentioned side of the piston, it would scarcely be possible to interrupt such escape of pressure fluid so effectively that in the course of the downward motion of the said part a sufficient counterpressure on the said side of the piston would be available for arresting it against the effects of gravity and of the pressure of the fluid acting on the opposite side of the piston.

The present invention has for its general object the provision of means whereby the said part can be retained against the effect of its own weight in an upper position for any desired period of time, then moved very quickly downwards from that position, and stopped again before it abuts any fixed part.

More specifically, the invention has for its object the provision of means independent from the fluid pressure for automatically retaining the said part in its upper position and thus rendering the application of fluid pressure to the piston unnecessary for such retention of the part in its upper position, so that the fluid pressure can be applied merely in accordance with the requirements of quick acceleration and deceleration.

A further object of the invention is the provision of means which after an initial downward displacement of the said part from its said upper position contribute in accelerating the said part downwards.

Further objects and advantages of the invention will appear from the description, now to follow, of two embodiments thereof given by way of example only, and in which reference will be made to the accompanying drawings, in which:

FIG. 1 shows, in schematic representation, one embodiment of the invention as applied to an apparatus for molding foils of synthetic resin;

FIGS. 2 to 7 schematically show part of the apparatus represented in FIG. 1 in six different positions of its moving parts;

FIGS. 8 to 10 show the said embodiment of the invention in three positions corresponding to different stages of the working cycle of the said apparatus; and FIGS. 11 to 13 show an alternative embodiment of the invention also in three positions.

The apparatus for molding synthetic resin sheets schematically shown in FIG. 1 has an upwardly open molding box 1 which at its rim has a surface 2 for supporting a synthetic resin foil 3 to be molded. A frame 4 which is swingably secured to the molding box 1 by means of a hinge (not shown) which can be drawn towards the molding box on the side opposite the hinge by means of a locking device (not shown either), permits pressing the foil 3 tightly onto the supporting surface 2 over the whole peripheral extent thereof. In the molding box 1 a mold 5 is disposed which has a molding recess 6 of the same shape as that which the outside of the article to be produced from the foil 3, e.g. a dish, is to have. The mold 5 also has an upper supporting surface 7 for the foil 3. Ducts 8 connect the molding recess 6 to the space surrounding the mold in the box 1, which can be evacuated through a conduit 9.

A pre-drawing plug 10 cooperates with this vacuum-molding apparatus; this plug can be moved up and down by actuating means which will be described hereinafter between the position in which it is shown in full lines and the position 11 indicated in dash-and-dot lines. The apparatus also comprises a heating device, not shown in the drawing, for heating the foil.

Before molding the foil 3 is heated to its softening temperature by means of the last mentioned device. Thereupon, the pre-drawing plug 10 is quickly moved down into the position 11, so that the plasticized foil 3 is pressed against the supporting surface 7 and is drawn out into the recess 6 until its shape approximates that of the dish to be produced. Having attained the position 11, the pre-drawing plug 10 comes to standstill. Thereupon, the molding box 1 is quickly evacuated through the conduit 9, so that the atmospheric pressure which acts on the foil 3 from above presses the latter into close contact with the walls of the molding recess 6; thereby, the foil leaves the bottom of the plug 10, whereupon the latter is moved up again into its initial position. After the foil thus molded has cooled down and solidified, the conduit 9 is disconnected from the source of vacuum, the frame 4 is swung up and air of atmospheric or slightly higher pressure is admitted into the molding box 1, for instance through the conduit 9. The molded foil then can be removed and a new foil 3 can be clamped onto the molding box by means of the frame 4.

To prevent uncontrolled creeping of the foil 3 during its pre-drawing by the plug 10, it is advantageous to cause the downward movement of the latter to take place very quickly. Moreover, the plug should be stopped as accurately as possible in the desired position 11, so that it will draw the pre-drawn foil until it is near the bottom of the mold 5 but not in contact therewith.

The plug 10, which is fixed on a piston rod 12, is moved by means of compressed air admitted to a cylinder 13 in which a double acting piston 14 carrying the piston rod 12 is displaceable. In the cylinder 13, the piston 14 separates an upper working space 15 from a lower working space 16. By means of three-way cocks 17 and 18, respectively, these working spaces can each be connected as desired with a compressed-air conduit 19 and with an outlet 20, 21 to the atmosphere, and can be disconnected from both in an intermediate position of the respective three-way cock 17, 18.

As hitherto described, the apparatus for plug-assisted vacuum molding is well-known in the art and is not part of the present invention. However, the device which will now be described, embodies the invention proper. It serves for automatically retaining the piston rod 12 with the plug 10 and the piston 14 when these are in their upper stroke-end position.

Beneath the cylinder 13 a groove 23 is milled into an enlarged portion 22 of the piston rod 12 and a roller 25 supported by a swingable lever 24 is slidably fitted into that groove. The lever 24 is pivoted on a stationary pivot 27 fixed in a frame 26 which supports the cylinder 13. A traction spring 28 is hooked at its one end to the lever 24 by means of a pin 29 and at its opposite end to the frame 26 by means of a pin 30. The pin 30 is disposed in such a way in relation to the point 27 that the traction of spring 28 tends to rock the lever 24 clockwise as seen in FIGS. 1 and 8 when the piston rod 12 is in its upper stroke-end position and the lever 24 is in its corresponding angular position determined by the engagement of the roller 25 in the groove 23. However, if the piston rod 12 moves downward, carrying the roller 25 with it, it swings the lever 24 and the pin 29 downward beyond the straight line joining the axes of the pivot 27 and pin 30 to each other, so that the traction of the spring 28 now tends to swing the lever 24 counter-clockwise (FIG. 9). The groove 23 has at one end thereof a recess 32 which also is milled into the piston rod 12 and which extends at substantially right angles to groove 23 and is upwardly flared to such an extent that the lever 24 will have reached a fixed abutment 31 provided on the frame 26, before the roller 25 leaves the recess 32 in the course of the downward displacement of the piston rod 12 and that the roller 25 thus will be received by the recess 32 when the piston rod moves upwards again, provided of course that the lever 24 then still contacts the abutment 31. The recess 32 is so shaped and connects in such a way with the groove 23 that the roller 25 is pressed into the groove 23 during the upward motion of the piston rod 12, without lever 24 and the piston rod 12 becoming locked relative to each other.

The spring 28 is so dimensioned that the turning moment exerted by it on the lever 24 in the upper end position of the piston rod 12 and acting clockwise is greater than the opposite turning moment exerted on the lever 24 through the roller 25 by the weight of the piston rod 12 and of the parts connected thereto. In order to keep down the latter moment and the force to be supplied by the spring 28, it is convenient to arrange and dimension the parts so that a straight line connecting the axes of the roller 25 and of the pin 27 with each other in the position according to FIG. 8, does not form too great an angle with the vertical; however, that angle still should be great enough for preventing the lever 24 from impeding the downward motion of the piston rod 12 by self-locking action.

The described apparatus works as follows:

In their initial position the piston rod 12, the piston 14 and the plug 10 are retained in the position according to FIG. 1 by the spring 28, by means of the lever 24 and of the roller 25 which engages in the groove 23. The two three-way cocks 17 and 18 are in such positions that the working spaces 15 and 16 are connected with the atmosphere through the outlets 20 and 21, respectively (FIG. 2). The foil 3 then is clamped into the molding apparatus 1—10 and is heated to its softening temperature. When that has been done, the upper working space 15 is connected to the compressed air conduit 19, in which a pressure of for instance 5 atmospheres is maintained, by turning the three-way cock 17. The lower working space 16 remains connected to the atmosphere. The compressed air flowing into the working space 15 now presses the piston 14 and thereby the piston rod 12 and the plug 10 downwards, whereby part of the air contained in the lower working space 16 escapes without the pressure rising substantially above that of the atmosphere. The air pressure acting from above on the piston 14 therefore causes rapid acceleration of the said parts which move downwards t(FIGS. 3 and 4) and causes the foil 3 to be pre-drawn by the plug 10. The lever 24 (FIGS. 8 to 10) thereby is swung from the position according to FIG. 8 through that according to FIG. 9 into that according to FIG. 10. As soon as the roller 25 has left the groove 23 for the recess 32 and no longer engages the latter as well, the action of the spring 28 on the piston rod 12 ceases, and the spring merely draws the lever 24 against the abutment 31.

After the piston 14 and the parts 10 and 12 associated with it have effected a predetermined portion, e.g. two thirds, of their stroke, the two three-way cocks 17 and 18 are turned into their closed positions. The compressed air thus enclosed in the upper working space 15 now expands while the body of air enclosed in the lower working space 16 is compressed to a pressure which counteracts on one hand the pressure in the working space 15 and on the other hand the kinetic energy of the moved parts 10, 12, 14, and finally brings these latter to a standstill. The position in which these parts are to come to rest, i.e. the position 11 of the plug 10 (FIG. 1), can be adjusted appropriately by means of the control mechanism for the three-way cocks 17 and 18. At the moment at which the plug 10 has approached close enough to that position 11 or has reached it, each of the two three-way cocks 17 and 18 is reversed so that on one hand the upper working space 15 is connected with the atmosphere by the cock 17 through the outlet 20 and on the other hand the lower working space 16 is connected to the compressed air conduit 19 by the cock 21. The air flowing from that conduit into the working space 16 then presses the piston 14 upwards while overcoming the gravity force acting on the parts 10, 12, 14 and the piston 14 displaces air from the upper working space 15 into the atmosphere (FIG. 6). Towards the end of the upward stroke of the piston rod 12 the inclined wall of the recess 32 contacts the roller 25 supported on the lever 24 and forces that roller over into the groove 23 while lifting the lever 24 off the abutment 31. After having engaged the groove 23, the roller 25 moves upwards with the piston rod 12, whereby the lever 24 is first swung in the sense opposite to that of the turning moment produced by the spring (FIG. 9) until the direction of that turning moment changes due to the passage of the pin 29 to the other side of the straight line connecting the point 30 to the pivot 27. The spring 28 from then on assists the rotation of the lever 28.

After the piston rod 12 and the parts 10 and 14 connected to it, as well as the lever 24, have reached their initial position (FIGS. 1 and 8), the three-way cock 18 is again turned into the position in which it connects with the lower working space 16 with the atmosphere through the outlet 21 (FIG. 7). The air pressure in that working space which up to then counteracted the weight of the parts 10, 12 and 14 now becomes ineffective, but these parts are prevented by the spring 28, through the lever 24 and the roll 25, from falling back.

Actuation of the three-way cocks 17 and 18 preferably is effected in response to the motion of the piston rod 12 by means of Micro-Switches and electromagnets, excepting the first operation of the three-way cock 17 by which the upper working space 15 is connected to the compressed air conduit 19 and by which the downward motion of parts 10, 12 and 14 is initiated. That first actuation can be effected by hand, by means of a timer switch a predetermined time after the heating device has been switched on, or by a switch responsive to the temperature of the foil 3.

Instead of each of the three-way cocks 17 and 18, there may be two e.g. electromagnetically controlled valves, controlling the connection of the respective working space 15 or 16 with the compressed air conduit 19 and with the atmosphere, respectively.

In the alternative embodiment represented in FIGS. 11 to 13, the lever 24 is replaced by a toothed segment 33 supported on the pivot 27, the traction spring 28 acting in the same way on that segment as on the lever 24 in the embodiment represented in FIGS. 8 to 10 and the angular movement of which is limited by an abutment 34 serving the same purpose as the abutment 31. The piston rod 12 is provided with a short row of teeth 35 which mesh with the teeth 36 of the toothed segment when the piston rod 12 is in its upper stroke-end position (FIG. 11). During the downward motion of the piston rod the toothed segment then is rotated until it is near the abutment 34, whereupon the teeth 35 of the piston rod 12 disengage from the teeth 36 of the toothed segment 33 (FIG. 12) and the latter is swung down against the abutment 34 by the spring 28 (FIG. 13). When the piston rod 12 moves upwards, first the uppermost of the teeth 35 of the piston rod 12 engages a tooth gap of the toothed segment 33 (FIG. 12) and swings the latter clockwise away from the abutment 34; the remaining teeth 35 of the piston rod 12 successively engage corresponding tooth gaps of the toothed segment 33 while turning the latter back into its initial position (FIG. 11). The spring 28 in this alternative embodiment exerts on the toothed segment 33 a turning moment which is opposed to the turning moment resulting from the weight of the parts 10, 12 and 14 and which retains these parts in the initial position.

Of the teeth 35, only the uppermost must be provided; the remaining ones serve to reduce the load thereon in the upper stroke-end position of the piston rod 12 in which the whole weight of the parts 10, 12 and 14 is transmitted to the toothed segment 33. The turning moment produced by that weight and acting on the toothed segment can be reduced by keeping the radius of the pitch circle of the teeth 36 to a small dimension. In order to ensure an appropriate distance between the pin 29 and the pivot 27 of the toothed segment 33 in view of the turning moment to be exerted by the spring 28 on that segment, the pin 29 could be carried by a separate lever pivoted on the pivot 27 laterally of the toothed segment 33 and rigidly connected to the latter. Moreover, the upper position of the piston 14 should be such that the segment 33 is not turned clockwise so far that it disengages from the teeth 35 on the rod 12.

The pre-drawing plug 10 need not be fixed to the piston rod 12 itself; alternatively, it could be connected to that piston rod by a suitable linkage or gearing. The axis of the cylinder 13, of the piston 14 and of the piston rod 12 might then for instance be horizontal, whereby the force to be supported by the retaining device would be diminished by the weight of the piston 14 and of the piston rod 12.

I claim:

In a fluid-actuated mechanism comprising at least one upwardly and downwardly movable part having an enlargement thereon, a device for retaining said movable part in lifted position consisting essentially of fixed pivot means, a retaining lever pivoted thereon, a spring one end of which is fixed and the opposite end of which is operatively connected to said retaining lever at a point thereof situated with reference to the said pivot means in a direction opposed to the direction of action of the spring on said retaining lever, a fixed abutment in the path of angular displacement of said retaining lever for limiting on one side said angular displacement thereof, said enlargement having a groove comprising an axially extending funnel portion and a transversely extending portion connected to the bottom end of said funnel portion, a roller on said retaining lever engageable, while the latter contacts said abutment, by said funnel portion of said groove on movement of said movable part for coupling the latter to said retaining lever by engagement of said roller in said transverse portion of said groove, whereby further movement causes said retaining lever to swing away from said abutment into a position causing said spring to exert an upwardly directed force on said movable part, through said retaining lever, roller, and enlargement.

References Cited in the file of this patent

UNITED STATES PATENTS

| 542,708 | Johnson | July 16, 1895 |
| 1,455,841 | Kelly | May 22, 1923 |
| 1,579,241 | Papashvili | Apr. 6, 1926 |
| 1,813,801 | Haynes | July 7, 1931 |
| 2,515,287 | Audemar | July 18, 1950 |
| 2,636,233 | Perkon | Apr. 28, 1953 |
| 2,743,738 | Johnson | May 1, 1956 |
| 2,786,452 | Tucker | Mar. 26, 1957 |
| 2,792,915 | Smith | May 21, 1957 |
| 2,855,899 | Beaty | Oct. 14, 1958 |